Aug. 21, 1962  D. M. CAPLAN  3,050,087
FLEXIBLE HOSE

Original Filed Feb. 1, 1954  6 Sheets-Sheet 1

INVENTOR.
DAVID M. CAPLAN
BY
Attorney

Aug. 21, 1962 — D. M. CAPLAN — 3,050,087
FLEXIBLE HOSE
Original Filed Feb. 1, 1954 — 6 Sheets-Sheet 2

INVENTOR.
DAVID M. CAPLAN

INVENTOR.
DAVID M. CAPLAN

Aug. 21, 1962  D. M. CAPLAN  3,050,087
FLEXIBLE HOSE
Original Filed Feb. 1, 1954  6 Sheets-Sheet 4

INVENTOR.
DAVID M. CAPLAN
BY
Edmund J. Kendrick
Attorney

Aug. 21, 1962 D. M. CAPLAN 3,050,087
FLEXIBLE HOSE

Original Filed Feb. 1, 1954 6 Sheets-Sheet 6

INVENTOR.
DAVID M. CAPLAN
BY
Edward L Kendrick
Attorney

United States Patent Office 3,050,087
Patented Aug. 21, 1962

3,050,087
FLEXIBLE HOSE
David M. Caplan, Los Angeles, Calif., assignor, by mesne assignments, to H. K. Porter Company, Inc., Pittsburgh, Pa., a corporation of Delaware
Continuation of application Ser. No. 407,248, Feb. 1, 1954. This application Mar. 22, 1957, Ser. No. 648,482
9 Claims. (Cl. 138—121)

This invention relates to reinforced hose, and more particularly to hose having a corrugated elastomeric body with a wire-like reinforcement embedded therein.

Although the hose of the invention will have numerous applications, it has been found particularly useful as radiator hose and the like for water cooled engines of motor vehicles.

Radiator hose of the prior art has been rather expensive to make because of peculiar structural configurations and combinations of structures and materials necessary to meet severe physical requirements. In the first place, a radiator hose must not only be flexible, but also have a rather large burst strength and a definite tendency to resist vacuum collapse.

It is therefore an object of the invention to provide an inexpensive flexible hose having a relatively high burst strength.

Another object of the invention is to provide an inexpensive corrugated hose having reinforcement means fixed to it in a manner to resist both rupturing burst pressures and vacuum collapse.

A further object of the invention is to provide reinforcement means for a flexible hose to facilitate its economic manufacture.

These and other objects of the invention are achieved and the above-described and other disadvantages of prior art flexible hose are overcome by employing a corrugated tube of a rubber-like material, and a wire-like reinforcement embedded in the crests of the corrugations at a position closer to the external surfaces of the crests than to the internal surfaces of the crests.

One advantage of employing the hose of the invention is the fact that it has an unusually high burst strength. One reason for this resides in the fact that the circumferential tensile force created in the hose is about two times that of the axial tensile force in it. This means that a wire-like reinforcement must be positioned at the crests of hose corrugations rather than in the valleys thereof to cause circumferential tensile forces in the corrugations to effectively cancel the axial tensile forces acting on them.

Still further, the fact that the wire-like reinforcement is disposed closer to the outer surface of the hose corrugation crests than to the internal surface of the crests increases the burst strength of the hose because more tube material is located radially inwardly from the reinforcement. This, in turn, reduces failure of the hose due to a "cutting action" of the reinforcement as the rubber-like material is actually forced in engagement with the reinforcement.

In accordance with another feature of the invention, it is sufficient that the wire-like reinforcement be only fixed or bonded to or otherwise retained by the rubber tube rather than embedded in it, the bond between the reinforcement and the tube thereby preventing vacuum collapse of the tube. However, it is to be noted that in accordance with both the burst strength and vacuum collapse features of the invention it is desirable that the wire-like reinforcement be both embedded in and bonded to the rubber tube at a certain radial position inside of it. In addition, it has been found more economical to make the hose of the invention with helical corrugations and making the wire-like reinforcement actually a helical coil of wire having unstressed turns spaced a distance apart equal to the distance between the tube corrugations of the hose.

In accordance with another feature of the invention, radial offsets are provided in the wire-like reinforcement to space it from a mold in which it is cured to make its manufacture less expensive.

The above described and other objects and advantages of the invention will be better understood when taken in connection with the accompanying drawings made a part of this specification. However, it is to be understood that the embodiments of the invention shown in the drawings are merely illustrative of the invention and that the invention is by no means limited to the specific embodiment shown.

In the drawings, which are to be regarded as merely illustrative.

Figure 1:
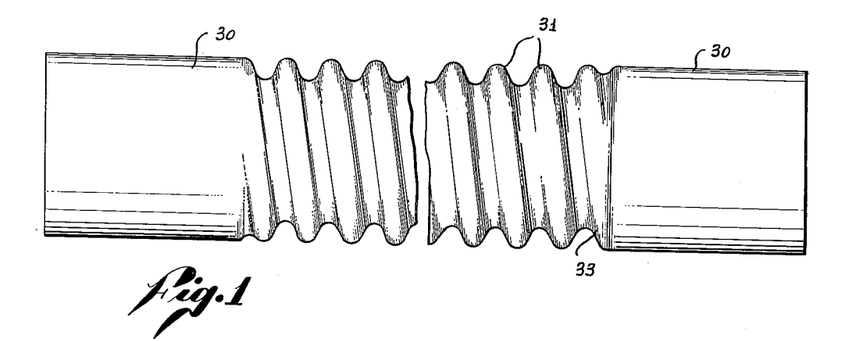
FIG. 1 is a side elevation of one embodiment of the invention as a radiator hose for use on automotive vehicles.
Figure 2:
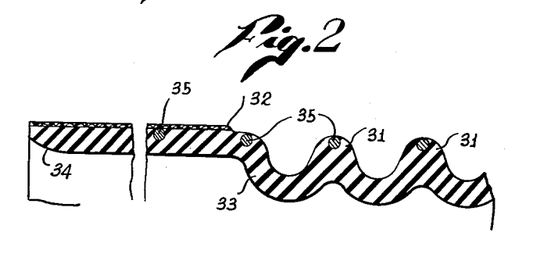
FIG. 2 is an enlarged longitudinal sectional detail of the hose showing wire-like reinforcement embedded therein.
Figure 2A:
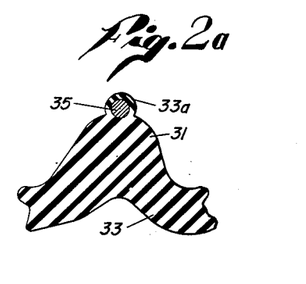
FIG. 2a is an enlarged longitudinal sectional and fragmentary view of an alternative embodiment of the hose of the invention.
Figure 3:
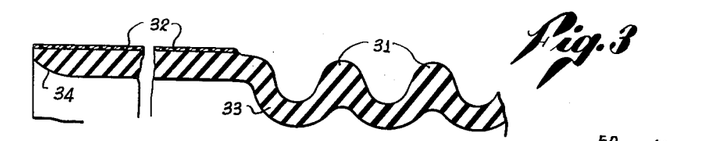
FIG. 3 is a similar longitudinal section showing the same hose with the wire-like reinforcement omitted.

FIG. 1 shows a selected embodiment of the invention as a radiator hose for automotive vehicles. The hose has two plain cylindrical ends 30 and a major intermediate portion formed with helical corrugations 31. As shown in FIG. 2, each of the cylindrical ends 30 is peripherally reinforced by sheet material, in this instance a fabric sleeve 32 which is unified with the rubber-like body 33 of the hose and each of the ends has a rounded internal taper 34. The purpose of the taper 34 is to facilitate the task of telescoping the end of the hose over a tubular member as required in the installation of the hose for service. Preferably the main intermediate longitudinal portion of the hose is reinforced by a wire-like reinforcement means 35. In this instance, the reinforcement means 35 is a helical coil of wire having its turns embedded in the crests of the helical corrugations 31. It will be noted that the helical coil of wire is continued into each of the two hose ends 30. FIG. 2a illustrates the fact that the wire-like reinforcement 35 may be only fixed or bonded to the rubber body 33. FIG. 3 illustrates the fact that the wire-like reinforcement means 35 may be omitted in some practices of the invention.

The rubber-like body 33 of the hose may be made of any suitable elastomer, including natural rubber, which is capable of being molded into a tube in its uncured state. Neoprene has been found highly satisfactory for this purpose, but various other rubber-like materials may be used.

Figure 4:
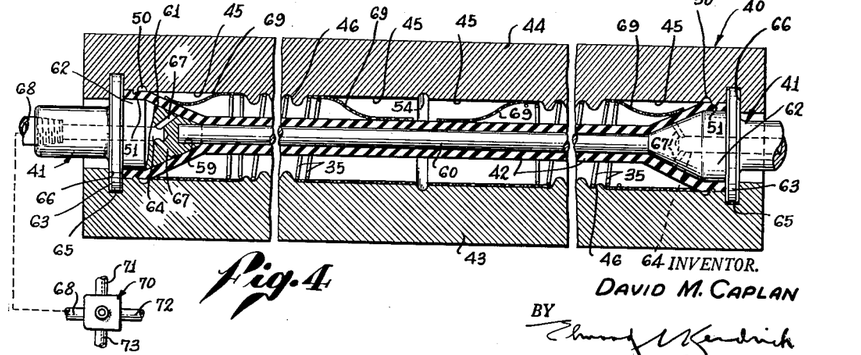
FIG. 4 is a longitudinal sectional view of a mold assembly with an uncured plastic tube mounted therein in preparation for the introduction of steam to expand and cure the tube.

The apparatus for carrying out the method of the invention may comprise a mold assembly shown in FIG. 4 which is a combination of a mold, generally designated 40, and a mandrel, generally designated 41, which co-operate for the processing of a suitably shaped and dimensioned uncured tube 42 of the thermosetting plastic material.

The hollow mold 40 is split longitudinally into two separable sections comprising a lower section 43 and an upper section 44 which may be held together in any well known manner for the purpose of carrying out a molding operation with appreciable internal fluid pressure. For example, a number of the assembled molds may be placed in a suitable press for simultaneous processing of a plurality of the uncured tubes 42. In this instance, the mold 40 is relatively long so that it may be used to mold a relatively long uncured tube 42 to form a series of integrally interconnected hose units in one operation. Accordingly, the interior wall of the mold is formed with a number of cylindrical portions 45 corresponding to the ends 30 of the hose units and is formed with an alternate series of circumferentially corrugated portions 46 corresponding to the intermediate corrugated portions of the hose units.

Figures 5, 6:
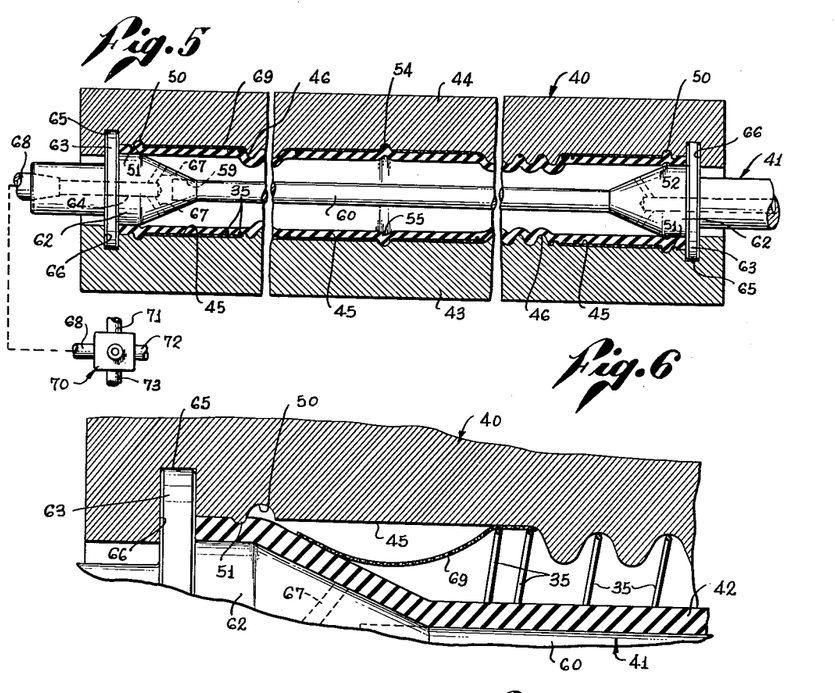
FIG. 5 is a view similar to FIG. 4 showing the result of introducing the steam under pressure.
FIG. 6 is an enlarged sectional detail showing the end portion of the uncured tube prior to the introduction of the steam.
Figures 7, 8:
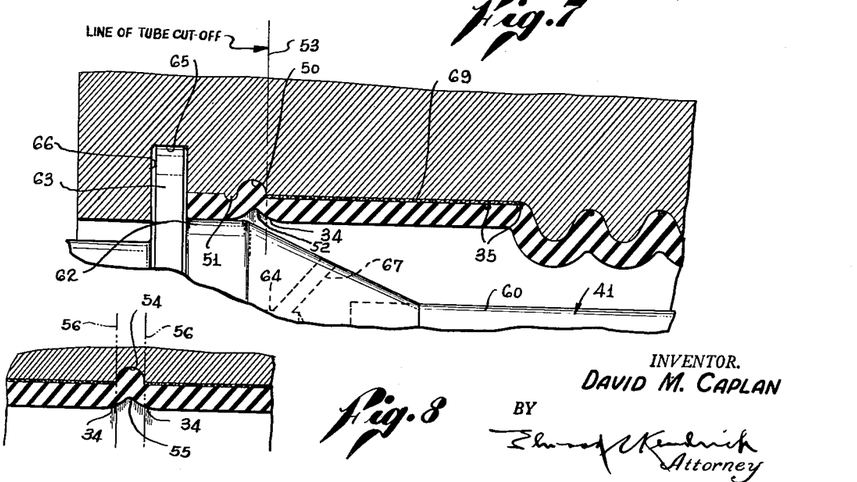
FIG. 7 is a similar view showing the result of the introduction of the steam under pressure.
FIG. 8 is a fragmentary sectional view showing a detail of the mold.

As best shown in FIGS. 6 and 7, the inner cylindrical portion 45 at each end of the mold 40 terminates adjacent a circumferential recess 50 in the mold wall and the recess in turn is adjacent a circumferential rib 51 in the mold wall. The purpose of the rib 51 is to cooperate with the mandrel 41 for the purpose of sealing off the interior of the uncured tube 42 from the surrounding interior of the mold 40. The purpose of the circumferential recess 50 is to form a circumferential pocket into which the material of the uncured tube 42 may flow and by such outward displacement form an inner circumferential groove 52 (FIG. 7) in the wall of the molded product. It will be noted that the circumferential groove 52 formed in this manner has inclined side walls so that when the finished product is cut transversely on the line 53 in FIG. 7, the result is a hose end having the desired entrance taper 34.

At intermediate points along the length of the mold 40 where two of the cylindrical portions 45 of the inner mold wall are adjacent to each other, a recess 54, similar to the recess 50, is formed circumferentially in the mold wall for the same purpose. Thus, as indicated in FIG. 8, in this region where two adjacent hose units in the molded product are interconnected end to end, the plastic material of the uncured tube 42 flows into the recess 54 to form an internal circumferential groove 55 in the molded product. The internal groove 55 has inclined side walls so that the molded product may be cut transversely along two lines 56 to form two hose ends having the desired entrance tapers 34.

The mandrel 41 is preferably adapted to serve a number of different functions. It serves, of course, as means for circulating steam under pressure through the plastic tube 42; it co-operates with the surrounding mold 40 to seal off the interior of the plastic tube from the interior of the mold; it serves as means for preparatory handling of the uncured tube 42 and for expeditiously positioning the uncured tube in the mold; and it serves as means to prevent the uncured tube 42 from sagging into contact with the surrounding mold. Preventing such sag avoids any possibility of the wall of the plastic tube being weakened locally by the inadvertent contact with a heated mold surface prior to the introduction of steam. Obviously, the mandrel 41 may be constructed in various ways to serve any number of these various purposes.

In the present construction, the mandrel 41 has a relatively long intermediate portion 60 and has two enlarged ends, each of the ends having a conical portion 61, a short enlarged cylindrical portion 62, and a radial flange 63. The purpose of the conical portion 61 is to flare the end of the uncured plastic tube 42 to the diameter of the enlarged cylindrical portion 62 of the mandrel and the purpose of the enlarged cylindrical portion is to co-operate with the surrounding circumferential rib 51 of the mold 40 for the purpose of sealing off the interior of the plastic tube from the surrounding interior of the mold.

It is contemplated that the mandrel 41 will be made in two separable sections to permit the mandrel to be inserted into a plastic tube 42. In this instance, for example, one of the enlarged ends of the mandrel is a separate piece with an inner blind bore 59 dimensioned to telescope onto the intermediate portion 60. Thus, with the two sections of the mandrel separated, the intermediate portion 60 of the mandrel may be inserted through an uncured plastic tube 42 and then the two mandrel sections may be assembled together as shown in FIG. 4. It will be noted in FIG. 4 that when the two sections of the mandrel are assembled together and the mandrel is placed inside the mold 40, the two radial flanges 63 at the two ends of the mandrel seat into complementary circumferential grooves 65 in the wall of the mold 40 whereby the mold serves as means to keep the two sections of the mandrel from separating in response to internal fluid pressure. Any tendency of the two mandrel sections to move apart longitudinally is prevented by the fact that each of the radial flanges 63 serves as a radial shoulder in abutment against a co-operating radial shoulder 66 formed in the mold.

The mandrel 41 is constructed to admit fluid for expansion of the uncured tube and has inlet and outlet ports to permit the fluid to circulate through the mandrel and plastic tube. To provide such inlet and outlet ports, each of the enlarged ends of the mandrel may have a short axial bore 64 and at least one inclined bore 67 extending from the axial bore to the surface of the conical portion 61 of the enlarged end. At least one of the enlarged ends of the mandrel is internally threaded at the entrance to the corresponding axial bore 64 for connection with an input pipe 68 from a suitable supply of steam and, if desired, the other end of the mandrel may be similarly threaded for connection with a return line. It is a practical matter, however, to have the outlet side of the mandrel discharge into the atmosphere, the outlet of the mandrel being suitably restricted to cause any desired degree of pressure to build up inside the mold.

Figure 10:
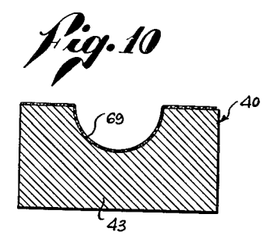
FIGS. 10, 11 and 12 are transverse sectional views illustrating one procedure for encircling the ends of the hose with fabric.

The manner in which the fabrication of the hose may be accomplished with the described apparatus may be readily understood by reference to the drawings. In a typical procedure, the two sections of the mandrel 41 are separated to permit the tubular portion 60 to be inserted through an uncured plastic tube 42. The helical coil of reinforcement wire 35 is then loosely slipped over the uncured plastic tube 42 and the two sections of the mandrel are assembled together with the plastic tube flared at each end and terminating at each end adjacent the radial mandrel flange 63. With the upper section 44 of the mold removed, a suitable strip of fabric 69 is laid across each of the plain cylindrical portions 45 of the lower mold section 43, as shown in cross-section in FIG. 10. Each of these fabric strips 69 forms the material of the previously mentioned fabric sleeve 32 on each end of a finished hose unit. The fabric strips 69 are coated on one side with a suitable adhesive, the adhesive side being uppermost in FIG. 10. In this instance, the adhesive coating may be a suitably tacky solution of the same uncured thermosetting plastic that is used for the uncured tube 42.

With the various fabric strips 69 in position in the lower half of the mold, the mandrel 41 is seated in the lower section 43 of the mold with one or two of the end turns of the wire reinforcement 35 among the valleys of resting on each of the adhesive fabric strips and with the intermediate turns of the wire reinforcement seated in the valleys formed by the internal circumferential corrugations of the mold.

Figure 9:
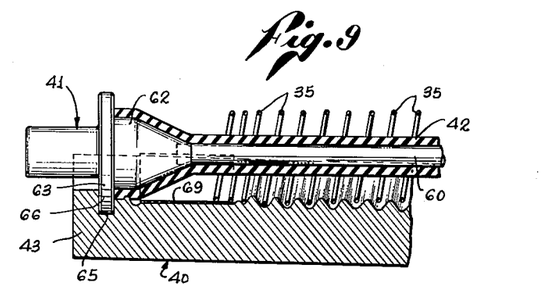
FIG. 9 is a fragmentary sectional view illustrating one procedure for placing the mandrel in the mold with distribution of the wire turns among the corrugations in the mold wall.

In the particular procedure illustrated by FIG. 9, one end of the mandrel 41 is first placed in the lower mold section 43, with the radial flange 63 at the end of the mandrel seated in the corresponding circumferential groove 65 in the mold wall and with the other end of the mandrel slightly elevated to hold the mandrel in inclined position as shown. It is a simple matter to distribute the turns of the wire reinforcement 35 among the valleys of the mold corrugations beginning at one end of the wire coil as indicated in FIG. 9. In this manner, the mandrel is brought to a final position in the lower section 43 of the mold with as many of the wire reinforcement coils seated in the mold as the number of end-to-end hose units that are to be formed in one molding operation.

Figure 11:
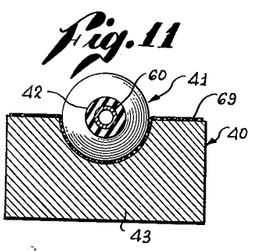
Figure 12:
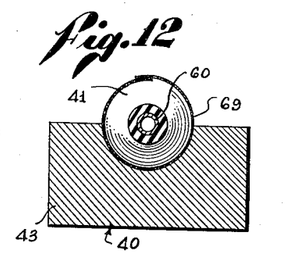

At this point in the procedure the fabric strip 69 cradle various portions of the plastic tube and wire reinforcement, and the next step is to bring the two ends of the fabric strips together, as may be understood by referring to FIGS. 11 and 12. At each end of the mandrel, the fabric strips 69 encircle one or two end turns of the wire 35 and sag onto the conically flared ends of the plastic tube 42 as shown in FIG. 6. At the end to end junctures of the hose units, the fabric strips 69 in like manner encircle one or two end turns of the corresponding wire coils and sag onto the plastic tube 42 as shown in FIG. 4. With the mold 40 closed and the two mold sections securely held together to withstand internal fluid pressure, the uncured plastic tube 42, together with the various coils of the reinforcement wire 35 and the various strips of fabric 69 are positioned as shown in FIG. 4.

The steam is now introduced into the mandrel 41 through the supply line 68 to fill the interior of the plastic tube 42 and to cause the plastic tube to expand radially outward against the various strips of fabric 69 and against the various coils of wire 35. This radial expansion of the plastic tube 42 is uniform by virtue of the fact that the plastic tube is of uniform thickness and by virtue of the further fact that the fluid pressure of the introduced steam acts uniformly in all directions. As the steam expands the plastic tube 42, it transmits heat rapidly to the tube to start the curing process and because of the rapid circulation of the steam through the length of the mold, the curing process starts in a practically simultaneous or instantaneous manner throughout the length of the plastic tube. While the fluid pressure of the steam is pressing the plastic tube 42 radially outward against the fabric, against the wire and against the mold walls, the heating of the plastic material by the steam causes the plastic to enter the temporary fluid or semifluid state that is characteristic of the curing process. The fluid or semifluid plastic material takes on the uniform fluid pressure of the steam and is thereby forced outward to seek aggressively to enter and completely fill every available crevice inside the mold. In this manner, the plastic material penetrates the interstices of the fabric strips 69 to completely impregnate the fabric and the plastic material likewise flows around the turns of the wire reinforcement 35.

It is contemplated that the surface of the wire reinforcement 35 will be copper coated or will be coated with an adhesive layer of the uncured plastic material, such as the layer 33a shown in FIG. 2a, or otherwise be treated so that there will be a certain affinity for the surface of the wire on the part of the fluid plastic material. With the wire surface highly wettable with respect to the fluid plastic material, the plastic material readily flows around the outer surfaces of the wire coil to embed the wire coil and an exceptionally intimate bond is established between the wire and the plastic material.

At the beginning of the heat treatment by the introduced steam, the wall of the uncured plastic tube 42 is under a substantial degree of tensile stress but when the stretched plastic material enters the fluid stage, all of the internal strains in the tubular body of plastic material are resolved. The helical corrugations of the interior mold wall have a certain desirable selective effect with respect to the flow of the plastic material, since the plastic material under the radially outward fluid pressure tends to fill the valleys between the mold corrugations. As a result the radial thickness of the plastic body 33 of the hose is increased at each of the crests of the external corrugations of the finished product. Thus, each of the finished hoses is thickened radially at each corrugation crest so that each crest serves as a reinforcing rib which extends radially a distance substantially at least as great as the radial depth of the intervening valleys. As clearly shown in FIG. 2, these ribs are solid throughout their extent between the intervening exterior valleys and the hose wall progressively increases from a minimum thickness along the concavo-convex bottoms of the exterior valleys to a maximum thickness at said crests. The embedded turns of the reinforcement wire 35 in each of the corrugation crests of the hose add further strength to the final product.

At the completion of the brief curing process, the mold and the associated mandrel are dismantled to release the molded tubular hose. The tubular hose is then cut transversely as indicated by the radial line 53 in FIG. 7 and the radial lines 56 in FIG. 8 to break the molded tubular product into separate hose units of the configuration shown in FIG. 1.

In the process just described, the product is completely cured in the mold. If desired, however, the hose may remain in the mold only long enough to take the desired final shape and then the semi-cured hose may be removed and the cure may be completed in another means such as an autoclave.

A feature of the preferred practice of the invention is the provision for the flow of a cooling fluid such as water or air through the mandrel 41 immediately after the steam curing step to cool the molded product and especially to cool the mandrel. Unless the mandrel is cool at the start of a new production cycle, the mandrel will heat the newly mounted uncured plastic tube and the weight of the tube will cause the upper wall of the tube to be softened more than the rest of the tube. Consequently the upper wall of the tube will thin out when the tube is subsequently expanded. The cooling of the mandrel by circulating fluid at the end of a production cycle makes it possible to start the next production cycle without loss of time.

To provide for such circulation, FIGS. 4 and 5 show by way of example the input pipe 68 connected to a multiple-position valve 70. At a first position in a preferred cycle of fluid flow the valve 70 cuts off the input pipe 68 to permit assembly of the mold; at the next position it admits steam to the input pipe from a steam line 71; at the next position in the fluid cycle the valve cuts off the steam line and admits water to the input pipe from a water line 72 to flow through the mandrel and cool both the mandrel and the molded product; at the final position of the valve in the fluid cycle it cuts off the water line and admits compressed air to the input pipe from an air line 73 to blow the water out of the mandrel and for the further cooling of the mandrel. This fluid cycle may be shortened by omitting either the flow of water or the flow of air.

The purpose of FIGS. 6, 7 and 8 is to illustrate clearly the manner in which the plastic material enters the circumferential recesses 50 and 54 in the mold walls, and to illustrate the manner in which the fabric strips 69 are expanded against the mold by steam pressure inside the plastic tube. It will be noted that in each instance the fabric strip 69 terminates closely adjacent the associated mold recess 50 or 54.

Figure 13:
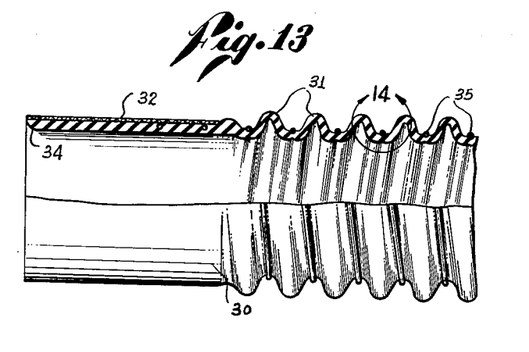
FIG. 13 is a view partly in side elevation and partly in longitudinal section illustrating another embodiment of the invention as a radiator hose.
Figure 14:
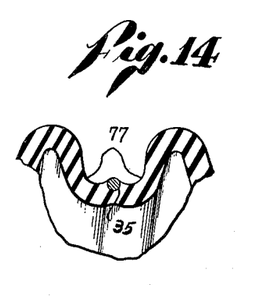
FIG. 14 is an enlarged detail taken as indicated by the circular arrow 14 in FIG. 13.
Figure 15:
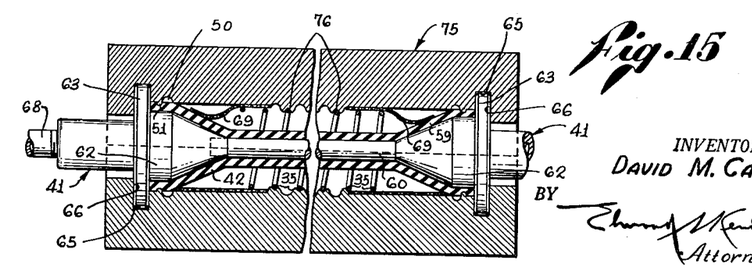
FIG. 15 is a longitudinal sectional view of a mold assembly that may be used to produce the hose shown in FIGS. 13 and 14.

FIGS. 13 and 14 show the construction of a second embodiment of the invention in which the reinforcement wire 35 is embedded in the valleys of the hose corrugations instead of being embedded in the crests. FIG. 15 shows the construction of a mold assembly that may be used to produce such a hose. Except for the fact that the wire reinforcement is in the valleys of the corrugations, the hose shown in FIG. 13 is largely identical to the first described hose shown in FIGS. 1 to 3, as indicated by the use of corresponding numerals to indicate corresponding parts. The mandrel 41 in FIG. 15 is unchanged and the mold, generally designated 75, is largely identical with the first described mold except for the fact that the internal corrugations of the mold 75 have small grooves 76 formed in the crests of the corrugations to serve as seats for the turns of the wire reinforcement 35. The operations for fabricating this second form of the hose are the same as heretofore described except for the care taken to seat the turns of the wire reinforcement in the mold grooves 76.

Preferably in this second practice of the invention, the corrugations in the mold walls are such as to cause the plastic material to be slightly thinned out in the valleys of the hose corrugations on each side of each turn of the wire reinforcement 35. FIG. 14 shows the thickness of the wall of the hose slightly reduced at the two points 77 in each valley on opposite sides of the embedded wire reinforcement 35. Thus, the finished hose is characterized by the provision of circumferential flexure zones or zones of minimum resistance to bending, these zones being positioned on each side of each turn of the embedded wire.

Figure 16:
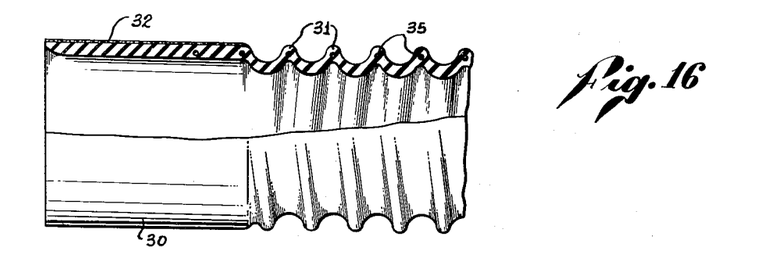
FIG. 16 is a view partly in side elevation and partly in longitudinal section showing another embodiment of the invention as a radiator hose.

While the two procedures just described result in embedding the wire reinforcement 35 in the plastic material of the hose wall in a thoroughly satisfactory manner, it may be desired in some instances to have the wire reinforcement embedded still deeper in the wall of the tube. FIG. 16, for example, shows the wire reinforcement 35 embedded in the crests of the hose corrugations approximately halfway between the inner and outer surfaces of the hose.

Figure 17:
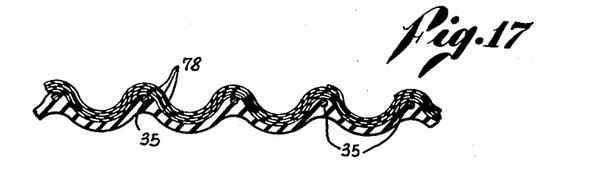
FIG. 17 is a fragmentary longitudinal section illustrating one stage in a procedure for fabricating the hose shown in FIG. 16.

One method for the fabrication of a hose with deeply embedded wire as shown in FIG. 16 includes the following steps: First, an uncured plastic tube 42 is processed with steam pressure in the manner illustrated by FIGS. 4 and 5, but in this instance, the fabric strips 69 are omitted. The result is an intermediate product in the form of a plastic hose of corrugated configuration with the turns of the wire reinforcement embedded in the crests of the configuration. Thus, the intermediate product is of the construction shown in FIG. 2 with the fabric sleeve 32 omitted. The resulting intermediate cured plastic product is then increased in thickness by wrapping a thin strip 78 of uncured plastic mtaerial around its periphery as shown in FIG. 17. The uncured plastic strip 78 may be of a width corresponding to four of the corrugations of the intermediate product and may be wrapped spirally in several layers to build up the thickness of the tube wall. The added plastic material also increases the thickness of the cylindrical ends of the hose where the end turns of the wire reinforcement are embedded in the cylindrical ends by the initial molding operation. Fabric strips 69 are placed on the ends of the built-up intermediate product and then the intermediate product is placed in a second mold of sufficiently larger diameter to accommodate the added uncured plastic material. In this second mold, the steam treatment is repeated to expand the material of the thickened tube against the surrounding mold walls and to cure the added layers of material.

The steam pressure employed in the various procedures disclosed herein will ordinarily range between 10 pounds and 100 pounds gauge pressure, but higher and lower pressures may be employed if desired. It is contemplated that more often than not the steam pressure will be on the order of 50 to 100 pounds gauge. When a built-up intermediate product is processed in a second mold as just described, the steam pressure will usually be increased and may be, for example, on the order of 100 pounds per square inch gauge pressure.

Figure 18:
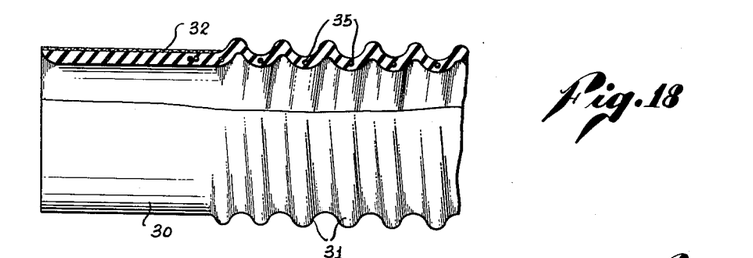
FIG. 18 is a view, partly in side elevation and partly in longitudinal section, of another embodiment of the invention as a radiator hose.
Figure 19:
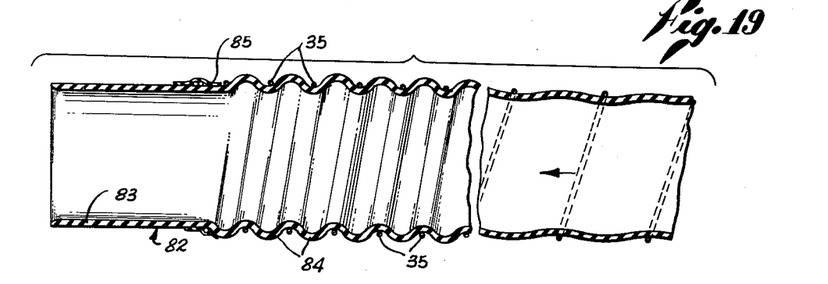
FIG. 19 is a longitudinal sectional view illustrating one stage in a procedure for fabricating the hose shown in FIG. 18.

FIG. 18 shows another embodiment of the invention which is somewhat similar to the hose shown in FIG. 13, but differs in having the wire reinforcement 35 buried deeper in the valleys of the hose. The procedure for fabricating the hose shown in FIG. 18 may be as follows: First, a tube 42 of the uncured plastic is steam-processed in a corrugated mold in the manner illustrated by FIGS. 4 and 5, but in this instance, both the fabric strips 69 and the coils of wire reinforcement 35 are omitted. The result is a thin-walled intermediate product, generally designated 82 in FIG. 19, which has cylindrical end portions 83 and has a major intermediate portion with corrugations 84. The next step is to place a coil of the reinforcement wire 35 around this intermediate product with the turns of the wire reinforcement resting snugly in the valleys formed by the corrugations 84.

Since the diameter of the helical turns of the wire reinforcement 35 is less than the diameter of the crests of the hose corrugations 84, a certain problem arises as to how to telescope the coiled wire onto the intermediate product 82. This problem is solved by stretching the corrugated intermediate product longitudinally as indicated at the right in FIG. 19, thereby stretching out the corrugations 84 to lessen the overall diameter sufficiently to permit the turns of wire 35 to be slipped over the corrugation crests. The end turns of the wire reinforcement 35 may be bonded in place by small adhesive strips 85 of the uncured plastic material as indicated on the left in FIG. 19.

Figure 20:
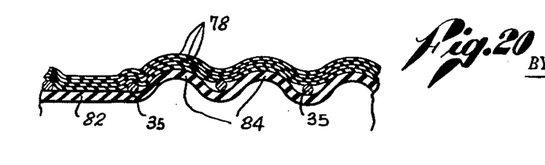
FIG. 20 is an enlarged longitudinal sectional detail illustrating a later stage in the fabrication of the hose shown in FIG. 18.

The next step is to build up the thickness of the wall of the intermediate product 82 by winding thereon several layers of the previously mentioned thin strip 78 of uncured plastic material, as shown in FIG. 20. The added material builds up the thickness of the corrugated portion of the intermediate product to cover the turns of wire reinforcement 35 and also builds up the thickness of the cylindrical ends 83 of the intermediate product. The previously mentioned fabric strips 69 are then added to the cylindrical ends 83 and the built-up intermediate product 82 is placed in a second corrugated mold similar to the first mold but of sufficiently larger diameter to accommodate the added uncured plastic. The built-up intermediate product is then processed by steam in the second mold to expand the wall material against the mold and to cure the added thickness of material.

Figure 21:
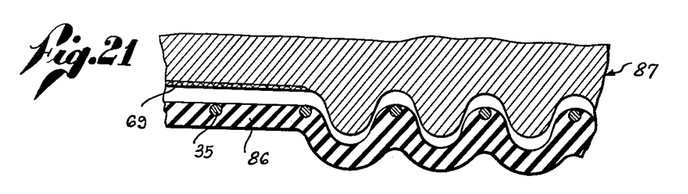
FIG. 21 is an enlarged longitudinal sectional detail illustrating one stage in another fabrication procedure that may be used to produce the hose shown in FIG. 16.

Another procedure that may be followed to fabricate the hose shown in FIG. 16 with the wire reinforcement 35 deeply buried in the crests of the hose corrugations, includes the following steps. First, an uncured plastic tube 42 is placed in a mold and processed as indicated by FIGS. 4 and 5, but in this instance, the fabric strips 69 are omitted. In carrying out this step, however, the steam treatment is greatly curtailed, the heat partially curing the expanded tube 42 primarily in its inner circumferential region and only to sufficient extent to cause the tube to maintain its expanded corrugated configuration with the turns of wire reinforcement 35 at least partially embedded in the corrugation crests. As indicated in FIG. 21, this partially cured intermediate product 86 is then placed in a larger mold 87. Fabric strips 69 are added at the end portions of the hose. Steam is then introduced into the second mold 87 to expand the partially cured intermediate product 86 to the full inside diameter of the mold and into intimate bonding contact with the fabric strip 69. Since the helical turns of the reinforcement wire 35 are of substantially smaller diameter than the valleys of the mold corrugations, the turns of wire remain spaced from the mold valleys, and the partially cured tube expands radially outward beyond the turns of wire thereby effectively burying the turns of wire under substantial thickness of the plastic material. The second steam process is prolonged sufficiently to accomplish a final cure with the hose at the larger diameter of the second mold.

Figures 22, 23, 24:
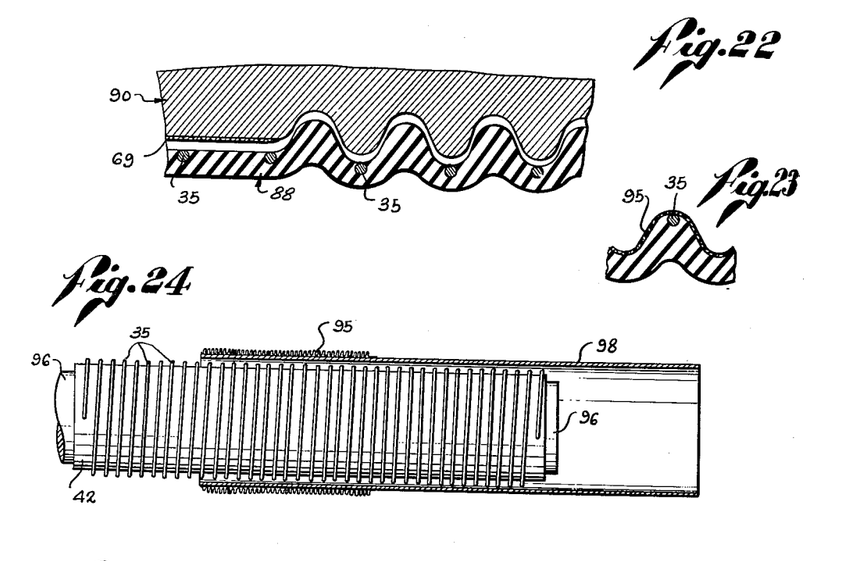
FIG. 22 is an enlarged longitudinal sectional detail illustrating one stage in a similar fabrication procedure that may be used to produce the hose shown in FIG. 18.
FIG. 23 is an enlarged fragmentary detail illustrating a further embodiment of the invention as a radiator hose.
FIG. 24 is a view partly in side elevation and partly in section, showing one stage in a procedure for fabricating the hose shown in FIG. 23.

The hose shown in FIG. 18 with the turns of wire reinforcement 35 deeply buried in the valleys of the hose corrugations may also be fabricated by a procedure similar to that just described. Thus, an uncured plastic tube 42 may be placed in a mold as shown in FIG. 15 with the turns of the wire reinforcement 35 in the grooves 76 in the crests of the mold corrugations. The fabric strips 69 are omitted. Here again, steam is introduced for a period of time sufficient merely to partially cure the expanded plastic tube primarily in the inner circumferential region of the tube with the turns of the wire reinforcement 35 at least partially embedded in the valleys of the hose corrugations. As shown in FIG. 22, the partially cured intermediate product 88 is then placed in a mold 90 of larger inside diameter and fabric strips 69 are also placed in the mold to form sleeves at the ends of the finished hose. Steam is then introduced into the second mold 90 to expand the partially cured intermediate product 88 to the full inside diameter of the mold and to complete the cure of the plastic material. Since the turns of the wire reinforcement 35 are of less diameter than the corrugation crests of the mold, the plastic material in the final curing stage flows radially outward beyond the turns of the wire thereby embedding the wire under substantial thickness of the plastic in the final product.

Figure 25:
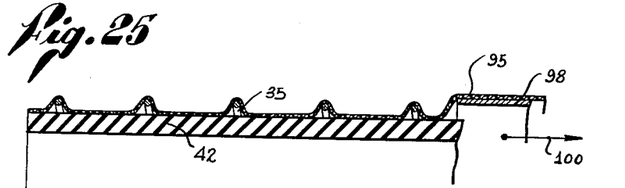
FIG. 25 is a fragmentary longitudinal sectional view showing a second stage in the procedure for fabricating the hose shown in FIG. 23.

FIG. 23 shows the structure of a radiator hose which is, for the most part, similar to the hose shown in FIGS. 1 and 2, but differs therefrom in the addition of a peripheral layer of sheet material in the form of fabric 95 constituting a sleeve covering the entire length of the hose. The procedure for fabricating the hose shown in FIG. 23 may be as follows:

First, an uncured tube 42 of the plastic material is placed on a suitably dimensioned cylindrical mandrel 96 in the manner indicated in FIG. 24 and then a helical coil of the reinforcement wire 35 is placed around the uncured tube 42 as shown. The peripheral fabric 95 in the form of an elastic woven fabric sleeve or stockinette is placed on a larger hollow cylindrical mandrel 98, with the stockinette 95 crowded or bunched at one end of the mandrel as shown in FIG. 24. The larger mandrel 98 carrying the woven sleeve 95 is then telescoped over the mandrel 96 carrying the uncured plastic tube 42 together with the wire 35 and then the resilient fabric sleeve 95 is progressively shifted onto the plastic tube 42 to cover the surrounding reinforcement wire 35 in the manner indicated in FIG. 25. In the course of this operation, the outer cylindrical mandrel 98 is progressively shifted relative to the plastic tube 42 as indicated by the arrow 100 in FIG. 25. The uncured plastic tube 42, with the wire 35 and the fabric sleeve 95 mounted thereon is placed in a mold in the manner indicated in FIG. 4 and fabric strips 69 are placed in the mold to form the reinforcing fabric sleeves 32 at the two ends of the finished hose. Steam is then introduced in the manner heretofore described to expand the uncured plastic tube 42 in the manner shown in FIG. 5, to produce the final product illustrated by FIG. 23.

Figures 26, 27, 28, 29:
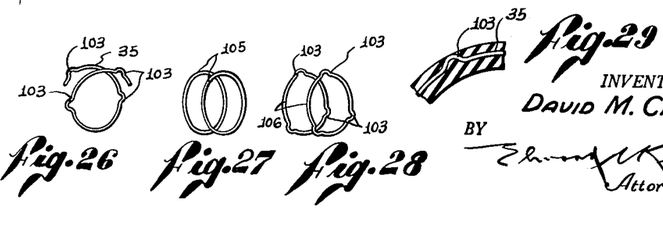
FIGS. 26, 27 and 28 are perspective views showing forms of wire-like reinforcement that may be employed in various practices of the invention.
FIG. 29 is an enlarged transverse sectional view of a portion of hose incorporating a wire-like reinforcement such as shown in FIGS. 26 and 28.
Figures 30, 31:
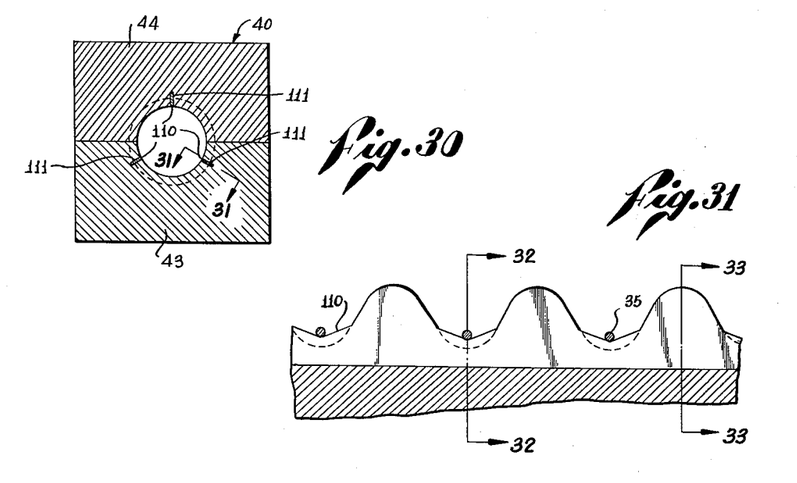
FIG. 30 is a cross-sectional view of a modified form of mold that may be used in one practice of the invention.
FIG. 31 is an enlarged section taken along the line 31—31 of FIG. 30.
Figure 32:
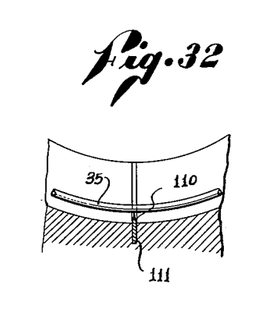
FIGS. 32 and 33 are sections taken along the lines 32—32, and 33—33, respectively of FIG. 31.

FIGS. 26, 27 and 28 show various forms that the wire reinforcement 35 may take in various practices of the invention. In the form shown in FIG. 26, the wire reinforcement 35 is in the form of a helical coil and the wire is further formed with small radial offsets 103. There may be, for example, three such offsets for each circumferential turn of the wire 35. FIG. 27 shows turns of the wire reinforcement 35 in the form of a series of circular circumferential rings as distinguished from helical convolutions. The rings 105 may be embedded in the crests of the hose corrugations, or in the valleys of the hose corrugations, or in both the crests and the valleys. FIG. 28 shows the turns of the wire reinforcement 35 in the form of a similar series of circular rings 106, which rings are further formed with the previously mentioned radial offsets 103.

When the turns of the reinforcement 35 are formed with radial offsets 103, the offsets contact the inner circumferential surface of the mold used in the steam process and thus serve as spacing means to maintain the major portion of the wire reinforcement at relatively great depth in the plastic material during the final curing stage. As a result, the radial offsets 103 extend to the periphery of the hose wall as indicated by the sectional view in FIG. 29, but the major portion of the wire reinforcement is embedded relatively deeply in the plastic wall of the hose. FIG. 29 shows that the reinforcement is also liberally spaced radially outward from the inner surface of the hose. Thus the radial offsets 103 serve as means to space the major portion of the wire reinforcement away from both the inner and the outer surfaces of the hose.

FIGS. 30–33 indicate how the mold 40 of FIGS. 4–9 may be modified to mold in one operation the hose shown in FIG. 16. The wire reinforcement 35 is relatively deeply embedded in the crests of the hose corrugations.

Figure 33:
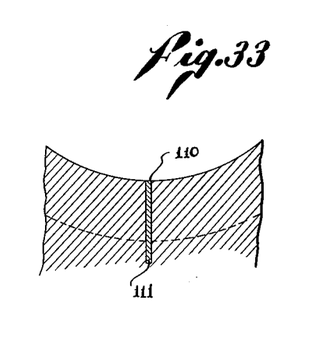

The modification of the mold consists in adding three longitudinal blade-like inserts 110 inside the mold, the inserts being spaced apart approximately 120°. A longitudinal slot 111 is milled in the inner circumferential wall of the mold to seat each blade-like insert 110. Each insert completely fills the slot 111 in the region of each of the crests of the mold corrugations, as indicated in FIG. 33, and conforms to the sloping sides of each crest but spans the valley between each mold crest to serve as means to space the wire-like reinforcement 35 radially inward from the bottom of each valley. Preferably the blade-like insert 110 is slightly cut away at each valley to form a shallow V-shaped seat to center the wire-like reinforcement as may be seen in FIG. 31.

Since the three inserts space the turns of the wire-like reinforcement inward from the bottoms of the mold valleys, the turns of the wire reinforcement are embedded deep in each crest of the finished hose. The exposed edges of the knife-like insert 110 form corresponding incisions in the crests of the hose corrugations, but such incisions are unnoticeable and insignificant.

My description in detail of various specific practices of the invention will suggest to those skilled in the art various changes, substitutions and other departures from my disclosure that properly lie within the spirit and scope of the appended claims.

This application is a continuation of my copending application Serial No. 407,248 filed February 1, 1954, for Flexible Hose, now abandoned.

What is claimed is:

1. A mold-formed flexible hose comprising an interiorly and exteriorly corrugated tubular body molded from thermosetting plastic material, the exterior corrugations being defined by ridges and intervening valleys, the crests of said ridges, in cross-section axially of said hose, having a continuous, smooth, arcuate, mold-formed outer surface free of protuberances and added material, and wire-like reinforcing means encircling said body and secured to said ridges at the crests thereof, said reinforcing means having a portion of its outer surface substantially immediately contiguous the outer surface of said crests and being completely surrounded by thermoset plastic material, the thickness of said material radially outwardly of said reinforcing means being less than the thickness thereof radially inwardly of said reinforcing means.

2. A flexible hose as set forth in claim 1 in which said ridges are helical and said reinforcing means is a helical coil of wire.

3. A flexible hose comprising an interiorly and exteriorly corrugated molded tubular body wall of thermosetting plastic material, the exterior corrugations being defined by ridges and intervening valleys, the wall at said ridges having a radial thickness substantially equal to the radial distance between the crests of said ridges and the bottoms of said valleys and being solid throughout the major portion of their extent between said valleys and along a line joining the bottoms of the valleys adjacent thereto and the radial thickness of the wall at said valleys being less than said radial thickness of said wall at said ridges and wire-like reinforcing means encircling said body and embedded in the crests of said ridges.

4. A flexible hose as set forth in claim 3 wherein said corrugations are helical and said wire-like reinforcing means is a helical coil of wire.

5. A flexible hose as set forth in claim 3 wherein said corrugations are helical and said wire-like reinforcing means is a helical coil of wire comprising normally axially unstretched, helical turns of wire which are bonded to said thermosetting material in which they are embedded.

6. A flexible hose as set forth in claim 3 wherein said reinforcing means is disposed off-center with respect to the radial thickness of said ridges and closer to the exterior surface than to the interior surface of said crests but substantially entirely covered by said plastic material.

7. A molded hose comprising a body of elastomeric material having cylindrical attaching portions at each end thereof and helical corrugations extending therebetween and provided with a molded outer surface, a helical spring covered with elastomeric material surrounding the body and having the ends thereof secured to said attaching portions and the convolutions of the spring secured to the outer surface of the crests of the corrugations, the body having a greater than normal diameter at the crests which normal diameter is appreciably less than the inner diameter of the convolutions, and the body in the troughs of the corrugations and the cylindrical attaching portions being in unstressed condition.

8. A mold-formed, spirally corrugated, reinforced hose comprising a preformed tubular body of elastomeric material having cylindrical attaching portions at each end thereof and provided with a molded outer surface, a helical spring having spaced convolutions surrounding the body and permanently attached thereto and having the ends thereof secured to the cylindrical attaching portions, the spaced convolutions of the spring being secured to the outer surface of the body at the crests thereof, the body having a depressed trough molded in the surface thereof forming a corrugated wall with the trough portions thereof terminating in an arc extending below the inner diameter of the attaching portion and being in unstressed condition, said inner diameter being appreciably greater than the normal inner diameter of said attaching portion.

9. A flexible hose comprising a tubular body of thermosetting plastic material with turns of a wire-like reinforcement embedded therein, each of said turns having a plurality of radially outward offsets extending substantially to the peripheral surface of the tubular body whereby the major portion of each turn is embedded in said body at a radial depth corresponding substantially to the radial dimension of said offsets.

References Cited in the file of this patent

UNITED STATES PATENTS

| | | |
|---|---|---|
| 1,797,193 | Kimmich | Mar. 17, 1931 |
| 1,926,628 | Morehouse | Sept. 12, 1933 |
| 2,073,335 | Connell | Mar. 9, 1937 |
| 2,396,059 | Roberts | Mar. 5, 1946 |
| 2,524,679 | Roberts | Oct. 3, 1950 |
| 2,560,369 | Roberts | July 10, 1951 |
| 2,570,259 | McKinley | Oct. 9, 1951 |
| 2,620,514 | Sampson et al. | Dec. 9, 1952 |
| 2,713,381 | Seck | July 19, 1955 |

FOREIGN PATENTS

| | | |
|---|---|---|
| 328,806 | Germany | Nov. 5, 1920 |
| 934,912 | France | Jan. 19, 1948 |
| 839,089 | Germany | May 15, 1952 |

UNITED STATES PATENT OFFICE
CERTIFICATE OF CORRECTION

Patent No. 3,050,087                                             August 21, 1962

David M. Caplan

It is hereby certified that error appears in the above numbered patent requiring correction and that the said Letters Patent should read as corrected below.

Column 5, line 49, for "among the valleys of" read -- for each hose section --.

Signed and sealed this 18th day of December 1962.

(SEAL)
Attest:

ERNEST W. SWIDER                                      DAVID L. LADD
Attesting Officer                                         Commissioner of Patents